March 2, 1965 E. W. YOUNG 3,171,953
COUNTER
Filed March 30, 1962 3 Sheets-Sheet 1
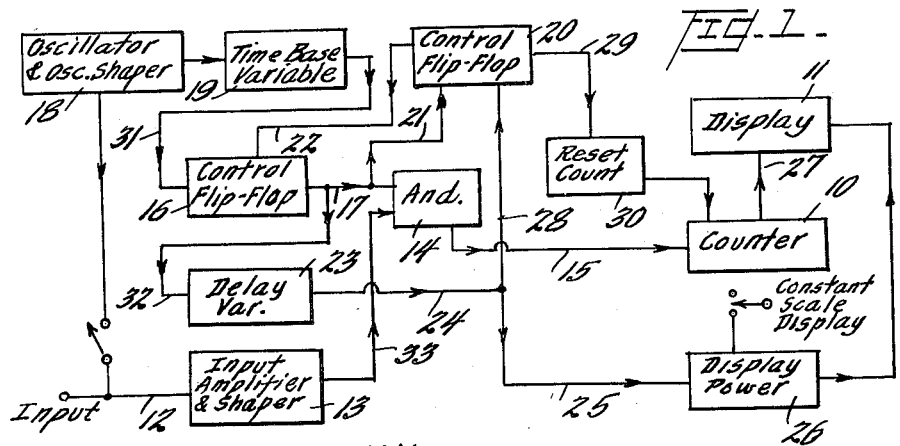
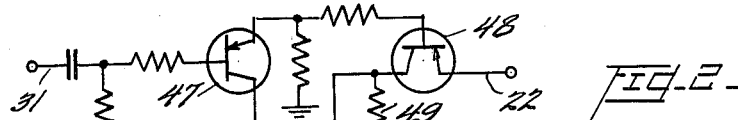
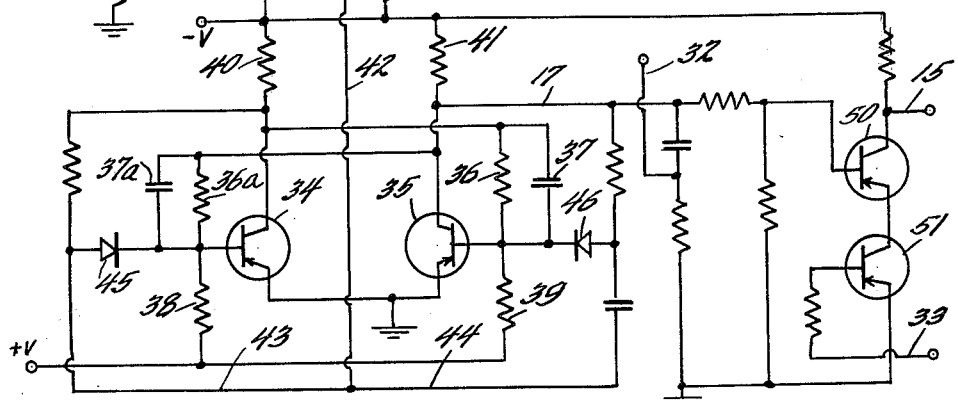
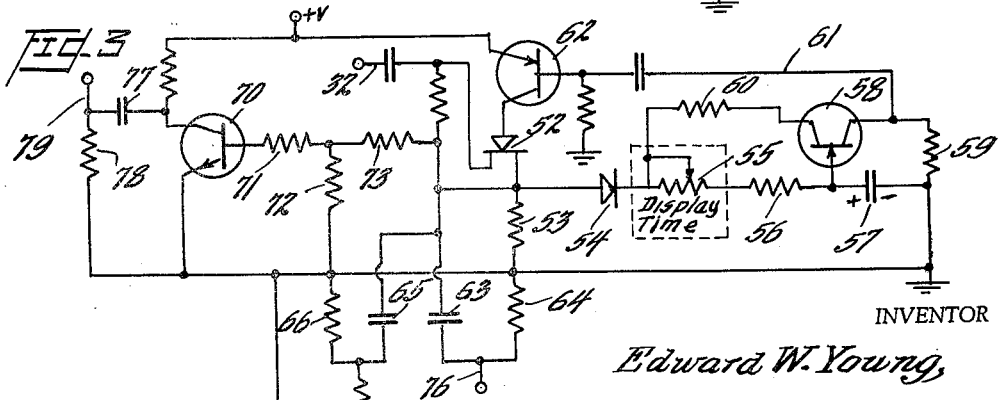
INVENTOR
Edward W. Young,
BY Poris, Haskell and Levine
ATTORNEYS

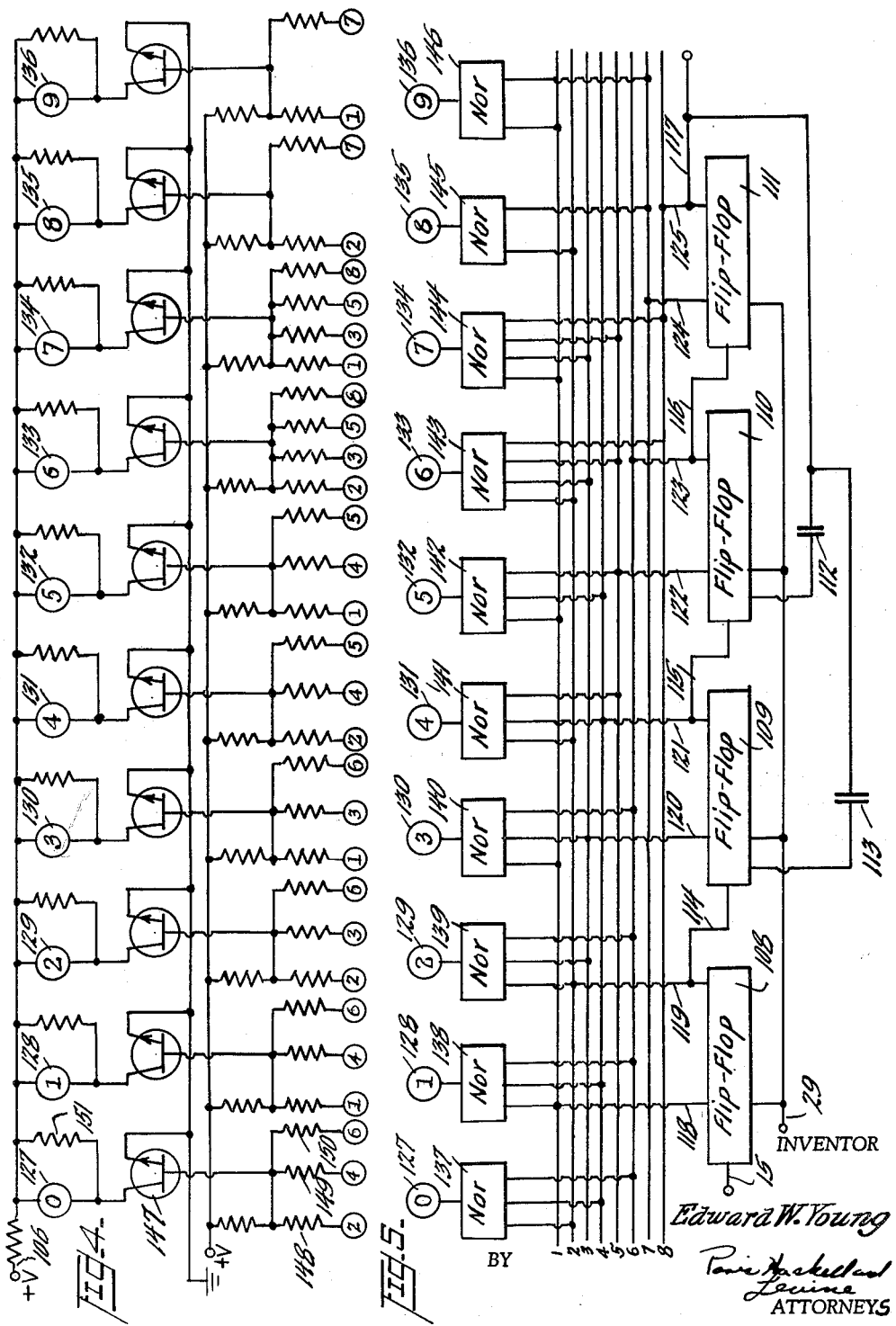

March 2, 1965   E. W. YOUNG   3,171,953
COUNTER
Filed March 30, 1962   3 Sheets-Sheet 3
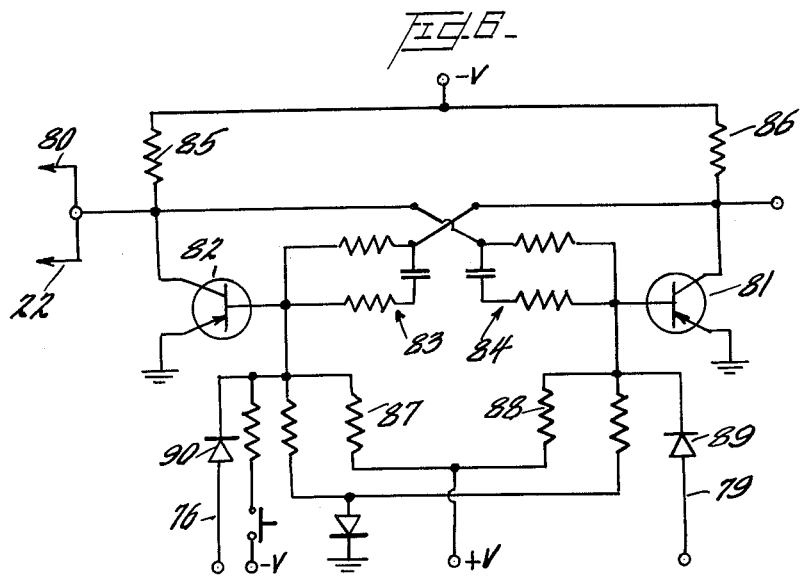
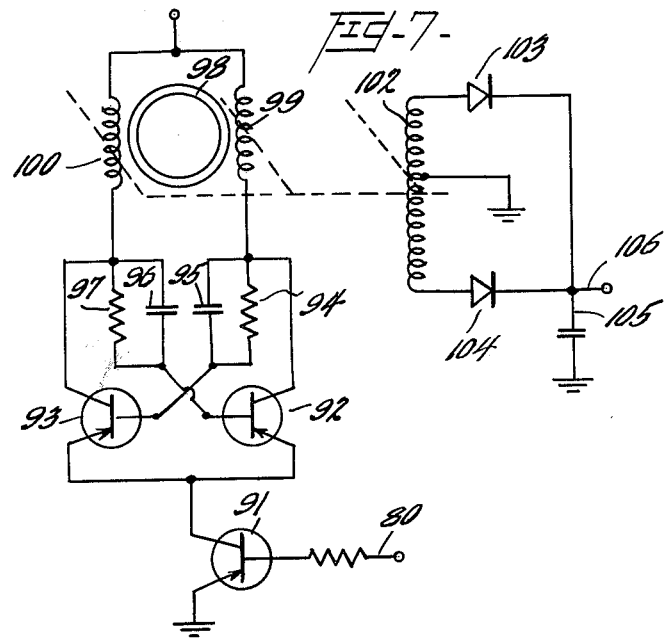
INVENTOR
Edward W. Young,
BY Paris, Haskell and Levine
ATTORNEYS

United States Patent Office 3,171,953
Patented Mar. 2, 1965

3,171,953
COUNTER
Edward W. Young, Trevose, Pa., assignor, by mesne assignments, to United Aircraft Corporation, a corporation of Delaware
Filed Mar. 30, 1962, Ser. No. 183,853
6 Claims. (Cl. 235—92)

The invention generally relates to improvements in pulse counters or frequency meters and more particularly is concerned with portable pulse counters having indicators for displaying the count frequency.

It is oftentimes desirable to provide a battery powered portable pulse counter and display device for sampling the rate or frequency of pulses from an unknown source, and being provided with a luminant display for indicating the pulse rate or frequency of the source being sampled. The difficulty in making such devices portable is the fact that a relatively large number of components are required to provide a sufficiently versatile counter, and accordingly the energizing current drawn by the circuit, and particularly by the luminant display means, requires larger batteries than is generally desired for portable use. Alternatively, if lower capacity batteries are employed, the counter has a shorter useful life of operation before recharging of the batteries becomes necessary.

According to the present invention, there is provided an improved miniaturized portable pulse counter and luminant display of this type that is capable of sustained operation over relatively longer periods of time without requiring recharge of the batteries.

Very generally according to the present invention, there is provided a pulse counter that is adapted to alternately count pulses for preselected time intervals and then display the accumulated count for a second preselected interval, with the counting interval and display interval both being independently adjustable as desired by the operator. The counting interval is controlled by an adjustable frequency pulse source or timer that controls the turning on and off of the counter mechanism in response to successive pulses of the reference frequency, and the display interval is independently controlled by means of a variable time delay circuit that functions to energize the display means only after each count interval is completed and for a preselected time interval thereafter. By independently controlling the counting and display intervals, the counter mechanism may be employed in a wide variety of useful applications and finds particular applicability in portable counting applications where it is desired to minimize the current drawn from the battery.

It is accordingly a principal object of the invention to provide a versatile digital pulse counter and luminant display that is particularly adapted for portable application.

A further object is to provide such a counter that is capable of sampling pulses at a variety of different frequencies, and luminantly displaying the count.

A still further object is to provide such a luminant display that is intermittently operated after each counting interval and for an adjustably variable time interval under the control of the operator.

Other objects and many additional advantages will be more readily understood by those skilled in the art after a consideration of the following specification taken with the accompanying drawings, wherein:

FIG. 1 is a block diagram representation of one preferred counter system according to the invention, FIG. 2 is an electrical schematic illustration of a preferred circuit for the control flip-flop and "And" circuit, FIG. 3 is an electrical schematic drawing of a preferred circuit for the variable delay and reset mechanism, FIG. 4 is an electrical schematic illustration of a preferred circuit for the indicator display unit, FIG. 5 is a block diagram representation illustrating the interconnection of the counter circuit and the indicators, FIG. 6 is an electrical schematic illustration of another flip-flop preferred circuit, and FIG. 7 is an electrical schematic illustration of a preferred circuit for the display power control and energizing unit.

Referring now to FIG. 1 for a detailed consideration of the mode of operation of the counter and indicator circuit, the circuit is generally comprised of a counting means 10, an indicator means 11, and a cyclically operating control circuit for periodically enabling the counter 10 to count impulses received over an input line 12 for preset counting intervals, and after each counting interval has been completed, to display the count received for a preset display interval. After each periodic cycle of counting and display, the counter 10 is automatically reset to begin a new cycle.

According to the invention, both the counting interval and the display interval are independently adjustable; the counting interval being adjustable to accommodate different frequencies of impulses being received over input line 12, and the display interval being adjustable for many reasons, among which are the desirability for reducing the current consumption drawn from the battery by the indicator means and hence prolonging the life of the batteries before recharging becomes necessary.

Considering this circuit in detail, the input impulses to be counted are received over line 12 and are initially directed to an input amplifier and shaper circuit 13 for producing impulses of uniform wave form, which latter impulses are directed through an "and" circuit 14 and thence over line 13 to the counter 10 to be accumulated. For presetting the counting interval, the "and" circuit 14 is closed and opened by a control flip-flop circuit 16 that in one stability state produces a control signal over line 17 which closes the "and" circuit 14 and permits the input pulses to pass therethrough, and in an opposite stability state produces a control signal over line 17 which opens the "and" gate 14 to prevent the input pulses from passing therethrough. The control flip-flop circuit 16 is in turn cyclically operated to periodically reverse its stability state by means of a continuously operating oscillator circuit 18 driving a variable pulse divider or time base circuit 19 that is adjustable to vary the frequency of the control pulses leading to the flip-flop circuit 16.

For modifying the counting intervals, the oscillator circuit 18 may operate at a fixed frequency of about 1600 cycles per second and the pulse divider circuit 19 may be comprised of a number of stages that may be selectively switched into the circuit to provide pulses at frequencies of 100 cycles per second, or 10 cycles per second, or 1 cycle per second. Where the control flip-flop 16 is energized by control impulses at a frequency of 100 cycles per second, the "and" gate is alternately closed for a counting interval of .01 second and then opened for a like period, whereas where the control pulses are at a frequency of 10 cycles per second, the counting interval is .1 second, and similarly where the control impulses are at a frequency of 1 cycle per second, the counting interval is made 1 second. In this manner, the counting interval for accumulating the input impulses over line 12 is made adjustable by varying the frequency of the control impulses energizing the flip-flop 16, which is performed in the preferred embodiment by adjusting the pulse division ratio of the pulse-divider 19. After each such counting interval, the next succeeding control impulse energizing the flip-flop 16 reverses the flip-flop for a time period equal to the counting interval whereby the counter is normally cut off from receiving input pulses for a time equal to the counting interval.

To insure that the counter 10 remains disabled and does not count any input impulses during the display interval, there is provided a second control flip-flop circuit 20, being connected in a feed-back relationship with the first flip-flop circuit 16. At the end of each counting interval, when the first control flip-flop 16 is reversed, an impulse is produced over line 21 to the second control flip-flop 20. This impulses reverses the stability condition of the second control flip-flop 20, and the second control flip-flop 20 in response thereto produces a feed-back control signal over line 22 to the first control flip-flop 16 to disable the first control flip-flop 16 from responding to any future control impulses received from the variable time base 19. Thus, after the completion of each counting interval, a second control flip-flop circuit 20 is energized to disable the first flip-flop circuit 16 and consequently prevent any further input impulses over line 12 from reaching the counter 10.

After each such counting interval has been completed, the indicator or display means 11 is then energized for a preset display interval to indicate the count standing in the counter 10. This is performed by means of a delay circuit 23 that is suitably energized by the control flip-flop circuit 16 at the end of each counting interval to produce an impulse over line 24 having an adjustable pulse width. This adjustable width impulse is employed over line 24 and line 25 to actuate a display power circuit 26 which is connected to energize the indicator or display circuit 11 and apply power thereto. As is observed, the display circuit 11 is connected at all times to the counter circuit 10 by means generally indicated as 27, and the function of the display power circuit 26 is therefore to connect and disconnect the display indicators from the battery or other power source. Upon applying the battery or power source to the display unit 11, the indicators therein will be energized to respond to the count in the counter circuit 10 and thereby indicate the count standing therein. The display power circuit 26 responds only during the duration of this variable width impulse and upon the termination of this impulse, the display power circuit 26 is deenergized to again disconnect the power from the display indicators 11.

After the termination of the display interval, it is desired to reset the counter 10 and to also reestablish the response of the control flip-flop circuit 16 to the oscillator 18 and variable pulse divider 19. This is performed by energizing the second control flip-flop 20, by the delay circuit 23 at the end of each display interval. At the end of each display interval, therefore, the termination of the delay pulse from circuit 23 produces a control impulse upwardly over line 28 to the second control flip-flop circuit 20. This latter control pulse reverses the stability state of the second control flip-flop circuit 20 thereby to produce two functions. In the first function, an output pulse is produced over line 29 leading to a reset count circuit 30 which functions to reset the counter mechanism 10 to its initial condition. In a second function, the control flip-flop circuit 20 restores the potential on its output line 22 leading to the first control flip-flop circuit 16 to reset or reestablish the functioning of the first control flip-flop circuit 16 to respond to the next succeeding control impulse from the variable pulse divider circuit 19.

Thus the duration of each counting interval is determined by the frequency of the control impulses received at flip-flop 16, and the counting intervals may be varied as desired by adjusting the pulse frequency being provided by the variable pulse divider or time base unit 19. The display interval, on the other hand is independently controlled in time duration by the setting of the variable delay circuit 23 which produces pulses of variable time duration depending upon its setting, and the time duration of these latter pulses controls the time interval that the display unit 11 is energized by the battery or other power source. To permit the display interval to be made either longer or shorter than the counting interval, the control flip-flop circuit 20 operates to automatically disable the flip-flop 16 after each counting interval whereby impulses cannot be applied to the counter unit 10 during the duration of the display interval. The control flip-flop 20 is, in turn, reset by the delay circuit 23 only after the display interval is completed and consequently the next counting interval cannot commence until after the previous display interval has been completed.

FIG. 2 illustrates one preferred circuit for the control flip-flop 16 and the "and" circuit 14 of FIG. 1. As shown, the control flip-flop 16 comprises a pair of transistors 34 and 35 interconnected in mutual feedback relationship in the manner of a conventional flip-flop or bi-stable circuit. The collector electrode of transistor 34 is interconnected with a base electrode of transistor 35 through a resistance capacity network 36 and 37 and similarly the collector electrode of transistor 35 is interconnected in feedback with base electrode of 34 by a similar resistor 36a and a capacitor 37a. The base electrodes of both transistors are biased from a positive source of potential through resistors 38 and 39, respectively, and the collector electrodes of the two transistors are energized from a negative supply through resistors 40 and 41, respectively. As is well known in flip-flop circuits of this type, the feedback relationship between the transistors 34 and 35 normally enables only one of the transistors to conduct current from its collector to its emitter electrode and maintains the other transistor in a cutoff condition. For reversing the stability state or reversing the conducting-nonconducting condition of the two transistors 34 and 35, an impulse applied over line 42 which is directed downwardly to the junction of lines 43 and 44, and thence applied in parallel to the base electrodes of both transistors 34 and 35 through the diodes 45 and 46, as shown. In operation, the repetitively produced impulses from the oscillator 18 and pulse frequency divider 19 are applied over line 31 to the base electrode of a switching transistor 47, thereby triggering the transistor 47 into operation. The collector electrode of transistor 47 is in turn connected to the base electrode of a transistor 48 that is normally biased to develop an impulse across resistor 49 in its collector-to-emitter circuit in response thereto, and hence transmits a trigger impulse over line 42 leading to the flip-flop stage, thereby reversing the conducting-nonconducting condition of transistors 34 and 35 in flip-flop circuit 16. As will be recalled from the discussion of FIG. 1, the potential on line 22 is obtained from the second control flip-flop circuit 20 and therefore the proper potential is obtained only when the second control flip-flop circuit 20 is in the correct state necessary to enable a counting interval.

The functioning of the flip-flop circuit 16, as described, produces the proper potential on its output line 17 to energize the base electrode of the "and" gate transistor 50 into operative condition. In series with the "and" gate transistor 50 is provided a second switching transistor 51 having its base electrode being energized over line 33 by the incoming impulses to be counted. Each of the incoming impulses over line 33 operates the transistor 51 to provide an operative connection between the transistors 50 and 51 and thereby enable counting pulses to be applied over line 15 to the counter circuit 10. On the other hand, if the "and" gate transistor 50 is not placed in operative condition by the proper potential on line 17 from the control flip-flop 16, the incoming impulses over line 33 cannot function through the inoperative gate transistor 50 and the pulses are not applied to the counter circuit over line 15.

So long as the flip-flop circuit 16 remains in the operative stability condition described, the "and" gate transistor 50 is properly energized to permit the transmission of the incoming impulses over line 15 to the counter 10. However, upon the next succeeding control impulse received from the frequency divider circuit over line 31, the flip-flop circuit 16 is triggered into its opposite stability condition, thereby changing the voltage on line 17 and closing the gate transistor 50. Consequently, as described above in connection with FIG. 1, the counting interval or interval wherein the input pulses are applied to the counter is determined by the stability state of the flip-flop circuit 16.

FIG. 3 illustrates the preferred variable delay circuit 23 for producing the variable duration or variable width impulses to control the display interval and perform other of the functions as described above. As will be recalled, this circuit 23 responds to an impulse over line 32 from the control flip-flop 16 at the end of each counting interval to perform two functions. In the first function an impulse is produced to energize the display power circuit 26 and control the display interval for the indicators or display unit 11 for a time equal to the duration of the variable width pulse. In the second function, at the end of this variable pulse width impulse, a signal is directed upwardly over line 28 to the control flip-flop circuit 20 to reverse the stability condition of the control flip-flop circuit 20 and reset the circuit.

To perform these functions, at the termination of the counting interval operation of the flip-flop 16, an impulse from flip-flop 16 is received over line 32 (FIG. 3) and directed to the control electrode of a silicon control rectifier 52, thereby firing the rectifier and passing current therethrough to produce a voltage across a series connected resistor 53. This voltage across resistor 53 is directed through a diode 54 and through series connected resistors 55 and 56 to gradually charge a capacitor 57 at a rate controlled by the time constant of resistors 55 and 56 and capacitor 57. This charging of the capacitor 57 determines the time interval or pulse width of the impulse being directed to the display power circuit 26 as discussed above. After a given time interval determined by the time constant of the circuit, the voltage across capacitor 57 reaches a sufficiently high value to trigger a transistor 58 into conducting condition. This discharges the voltage charge on capacitor 57 through resistors 59, resistor 60, and the current carrying electrodes of transistor 58 and produces a voltage drop across resistor 59 during the discharge of the capacitor 57. This voltage drop is directed upwardly over line 61 to energize the base electrode of transistor 62 in such manner and polarity as to cut off the current conduction through the transistor 62 and thereby disconnect the silicon control rectifier 52 from the source of potential. Current conduction through the silicon control rectifier 52 is thus terminated and the voltage drop across resistor 53 returns to zero to terminate the variable width pulse. For varying the time duration or the pulse width across resistor 53, the resistor 55 is made adjustable, as shown, to vary the time constant of the charging circuit for capacitor 57. Consequently this resistor 55 may be adjusted to vary the pulse width or pulse duration of the impulse produced by this circuit.

When the conduction through the silicon control rectifier 52 is cut off, the impulse developed across the resistor 53 is terminated, and a negative going impulse is produced by a differentiating circuit comprised of a capacitor 63 and resistor 64. This negative going pulse is directed over line 76 leading to the control flip-flop circuit 20 (FIG. 6) to reverse the stability state of flip-flop 20 to its initial condition. Consequently at the end of the display interval, the negative going differentiated impulse over line 76 resets the control flip-flop 20 as described above to reestablish operation of flip-flop 16 and reset the circuit in preparation for the next counting interval.

In addition, a second differentiating circuit is provided across resistor 53, and comprised of a capacitor 65 and a resistor 66. A second differentiated negative going impulse is therefore produced at the end of the display interval and is directed to trigger a transistor 67 into operation. This produces a positive impulse over line 29 that is employed to reset the counter 10 to zero as described above.

For operating the display power circuit 26 in response to this variable width impulse produced across resistor 53, the voltage developed across resistor 53 is directed through a resistance network, comprising resistors 71, 72, and 73 to energize a transistor 70 into conducting condition and thereby reverse the polarity of the impulse. This opposite polarity impulse is differentiated by means of capacitor 77 and resistor 78 to produce a negative going impulse over line 79 at the beginning of the display interval, which impulse is directed to the control flip-flop circuit 20 (FIG. 6) thereby to initially reverse its stability condition and perform two functions. In the first function, the flip-flop circuit 20 disables the control flip-flop 16 to prevent the counter 10 from operating during the display interval. In the second function, the control flip-flop 20 energizes the display power circuit 26 to operate the indicators 11.

FIG. 6 illustrates details of one preferred circuit for the flip-flop 20. As shown, this circuit comprises a pair of transistors 81 and 82 interconnected in a conventional type flip-flop circuit, similar to that described above in FIG. 2. At the end of each counting interval or the beginning of each display interval, a negative going impulse is directed over line 79 from the delay circuit 23 and passes through diode 89 to trigger the transistor 81 into conducting condition and cut off conduction through transistor 82. This increases the negative potential at the collector of transistor 82 and produces a more negative potential at each of lines 22 and 80 connected thereto. Line 22 energizes the emitter electrode of transistor 22 in the control flip-flop circuit 16 (FIG. 2) and disables the control flip-flop circuit 16 from responding to any incoming pulses to be counted during the display interval. Line 80 is connected to the display power circuit 26 (FIG. 7) and its negative energization activates the power circuit to apply power to the display unit 11.

At the termination of the display interval, the negative pulse from the delay circuit 23 (FIG. 3) is directed over line 76 to the base electrode of transistor 82, thereby reversing or resetting the flip-flop 20 with transistor 82 being rendered conducting and transistor 81 being cut off. The potential on output lines 80 and 22 is thereupon rendered more positive to deactivate the display power circuit 26 and to reset the control flip-flop 16 in preparation for the next counting interval.

FIG. 7 illustrates one preferred circuit for the display power circuit 26. As shown, this circuit comprises a multivibrator oscillator consisting of a pair of transistors 92 and 93 connected in feedback for sustained oscillation through the two windings 99 and 100 of a saturable magnetic core 98. Consequently, when the commonly connected emitter electrodes of these transistors 92 and 93 are connected to ground to complete energization of this circuit, oscillation of the circuit commences.

Also coupled to the transformer core 98 is a secondary winding 102 having a much greater number of turns whereby when the circuit oscillates, a greater voltage is produced across winding 102. Winding 102 is provided with a grounded center tap and interconnected with a pair of rectifier diodes 103 and 104 in a conventional full wave rectifier circuit. Thus upon oscillation, a higher voltage direct current potential is produced across the output filter capacitor 105 and directed over output line 106.

For controlling the application of power to the display indicators 11 by this circuit of FIG. 7, a switching transistor 91 is disposed in the emitter circuit of oscillator transistors 92 and 93. The switching transistor 91 is normally biased into nonconducting condition and consequently prevents the energization of these transistors 92 and 93 with the result that the oscillator does not function to produce a direct current potential on its output line 106. Upon receiving the proper potential over line 80 from the flip-flop circuit 20 at the beginning of the display interval, however, the transistor 91 is rendered conducting to enable the circuit to oscillate and produce an output direct current potential over line 106 to energize the display indicators.

FIG. 5 schematically illustrates a preferred counter mechanism 10 according to the invention, together with display indicators for reading out the count. As shown, each decade of the counter preferably comprises a series of four flip-flop circuits 108, 109, 110, and 111 being interconnected in cascade with the output of each flip-flop being connected to the input of the next. Normally the four stages completes its cycle of operation in response to sixteen input pulses received. To modify the counter into a decade or ten pulse responsive unit, there is provided a feedback capacitor 112 interconnecting the fourth stage 111 with the third stage 110, and a second feedback path, including capacitor 113 interconnecting the fourth stage 111 with the second stage 109. This type of modified scale of 16 counter is considered known to those skilled in the art and further details of its structure and mode of operation are not considered necessary herein.

To display the count accumulated in this decade stage, there is provided a series of ten indicator neon lamps or the like 127 to 136, inclusive, each of which is connected to a combination of three different ones of the counter stages by a NOR or coincidence circuit 137 to 146, inclusive, as shown. The NOR circuits are each part of a matrix, shown in FIG. 4, whereby the individual indicator lamps are selectively conditioned for energization only when the counter stages have accumulated a count corresponding to the number assigned to that indicator.

FIG. 4 illustrates details of one preferred NOR circuit that may be employed to selectively condition the different indicators for a decimal display of the count accumulated by the counter stages. Since the NOR circuit for each indicator is identical, only the circuit for the zero (0) indicator lamp 127 will be described.

As shown, the indicator lamp 127 is connected in series with the emitter-collector electrodes of a transistor 147 between the potential line 106 and ground. Consequently, when the proper potential is applied to line 106 together with the transistor 147 being rendered conductive, the indicator lamp 127 is energized to display a zero count. The base electrode of transistor 147 is connected to three resistors 148, 149, and 150, which are in turn connected to lines 2, 4, and 6 of the matrix as shown in FIG. 5. Consequently, when all of the matrix lines 2, 4, and 6 are coincidently at a proper potential, the transistor 147 is energized into a conductive condition to connect one terminal of the lamp 127 to ground potential. As will be noted from FIG. 5, the matrix lines 2, 4, and 6 are in turn connected to the zero output lines of stages 108, 109, and 110 of the counter whereby only when the decade counter has registered a count of zero will the matrix lines 2, 4, and 6 simultaneously exhibit the same potential. As a result, the NOR circuit for indicator lamp 127 is energized only when the counter stages register a zero count.

In a similar manner, the NOR circuits 138 to 146, respectively, for each of the other indicator lamps are selectively energized only when the counter has registered the count corresponding to the decimal number assigned to that indicator lamp whereby a different one of the lamps 128 to 136, inclusive, is conditioned for energization in response to each different count accumulated by the counter stages. As noted above, however, no one of the indicator lamps can be energized unless a voltage potential is controlled by the output of the display power circuit 26 (FIG. 7). Consequently, only during the display interval is the power line 106 energized, thereby to enable that one of the indicator lamps 127 to 136, inclusive, to be energized corresponding to the count registered.

The remaining circuits of the counter system as shown in FIG. 1 are considered conventional and known to those skilled in the art, and accordingly a description of detailed circuitry therefor is not considered necessary for an understanding of the present invention. For example, the oscillator and shaper circuit 18 may be comprised of a conventional tuning fork controlled oscillator that is suitable for portable application. Similarly, the controllable time base circuit 19 may be comprised of a number of cascaded flip-flop stages functioning as a pulse frequency divider together with suitable switching means for connecting a fewer or greater number of stages to vary the ratio of division and accordingly switch the time base as desired. Likewise, the input amplifier and shaper circuit 13 may be a conventional transistor amplifier provided with feedback to convert each of the incoming pulses into output pulses of uniform waveform.

It is contemplated that many changes may be made by those skilled in the art without departing from the spirit and scope of the invention. Accordingly, this invention should be considered as being limited only according to the following claims.

What is claimed is:

1. A pulse counter and indicator circuit comprising:
   a reference generator means for producing a repetitive series of reference impulses at a controllably adjustable frequency,
   a pulse counter,
   control means responsive to said reference generator for enabling input impulses to be counted to be applied to said pulse counter for a counting interval controlled by the frequency of said reference generator,
   an indicator for displaying the count accumulated in said pulse counter,
   a controllable display pulse generator energized by said control means at the termination of each counting interval to energize said indicator means for a preset display interval, to display the count received by said counter,
   a second control means responsive to said first control means to disable said first control means after each count interval thereby to prevent further counting during the display interval, said second control means being responsive to said delay pulse generator to reset said first control means after each display interval,
   means energized by said second control means for resetting the counter after each display interval,
   said reference generator means being adjustable to vary each of the counting intervals,
   and said delay pulse generator being independently adjustable to vary each of the display intervals.

2. In a pulse counter and indicator having successively operating means for counting pulses during a counting time interval and means for displaying the pulses previously counted during a succeeding display time interval,
   a first flip-flop circuit being repetitively energized to control the counting time interval during successive half cycles thereof,
   a second flip-flop circuit being energized by said first flip-flop circuit at the end of each counting time interval for disabling the first flip-flop circuit from further operation,
   and a delay circuit energized by said first flip-flop circuit at the end of each counting interval for energizing the display means for the duration of the display interval, and after completion of said display interval said delay circuit energizing said second flip-flop means to reestablish the functioning of said first flip-flop circuit in controlling the next succeeding counting interval.

3. In combination, a pulse counter, a count display means, and means for independently adjusting the time intervals for counting and display, said means comprising a bistable flip-flop circuit being energizable in one state to control the application of pulses to the counter and in a second state to prevent application of pulses to the counter, a feedback means energized by the flip-flop circuit in its second state to maintain the flip-flop in its second state, an adjustable time delay means energized by said flip-flop circuit in its second state for resetting said feedback means after an adjustable time delay, means responsive to said time delay means for energizing said display means during said adjustable time delay, and means responsive to said feedback means for resetting said counter when said feedback means is reset.

4. In the pulse counter and indicator of claim 3, said feedback control means comprising a second flip-flop circuit.

5. A battery operated pulse counter and indicator comprising: a pulse counter, a control means including a bistable flip-flop circuit and a gate circuit for applying and preventing the application of pulses to said counter, an indicator for displaying the circuit accumulated by said counter, indicator energizing means for selectively applying energization to said indicator, an adjustable time delay means responsive to said control means when pulses are prevented from being applied to the counter for operating said indicator energizing means during a given time delay, a feedback flip-flop circuit energized by said flip-flop circuit in a given state for disabling said flip-flop circuit, means interconnecting said time delay means to reset said feedback flip-flop circuit after said given time delay, and means interconnecting said feedback flip-flop circuit with said pulse counter to reset said counter after the feedback flip-flop is reset.

6. In a pulse counter and indicator, a counter circuit, a reset circuit for the counter, a gate circuit for applying pulses to said counter when the gate is open and preventing the application of pulses when the gate is closed, a feedback flip-flop circuit responsive to closing of said gate circuit to maintain the gate circuit closed, an indicator circuit for said counter, an adjustable time delay circuit energized upon closing of the gate circuit for energizing said indicator circuit to display the count during said adjustable time delay, means interconnecting said feedback flip-flop circuit and said adjustable time delay circuit to reset said feedback flip-flop circuit after said adjustable time delay, said feedback flip-flop and gate circuit being interconnected to condition said gate circuit for further operation when the flip-flop circuit is reset, and said reset circuit being energized upon said feedback flip-flop circuit being reset to reset said counter.

References Cited by the Examiner
UNITED STATES PATENTS

| | | | |
|---|---|---|---|
| 2,516,189 | 7/50 | Dinsmore | 235—92 |
| 2,743,419 | 4/56 | Chatterton et al. | 235—92 |
| 2,761,968 | 9/56 | Kuder | 234—154 |
| 2,803,405 | 8/57 | Howell | 235—92 |
| 2,828,468 | 3/58 | Ball et al. | 235—92 |
| 2,851,596 | 9/58 | Hilton | 324—68 |
| 2,864,948 | 12/58 | Neff | 235—92 |
| 2,922,576 | 1/60 | Winfield | 235—92 |
| 2,954,507 | 9/60 | Kitz et al. | 235—92 |
| 3,039,685 | 6/62 | Bagley et al. | 235—132 |
| 3,062,443 | 11/62 | Palmer | 235—132 |
| 3,063,631 | 11/62 | Ray | 235—92 |

OTHER REFERENCES

"A High Speed Precision Tachometer," by Bland et al., from "Electronic Engineering," January 1954, pp. 2–8.

MALCOLM A. MORRISON, *Primary Examiner*.